United States Patent [19]

Degens

[11] 4,158,712
[45] Jun. 19, 1979

[54] COMPOSITION BOARD WITH IMPROVED POLYMERIC SKIN

[76] Inventor: Alfredo Degens, 952 Ave. Delfim Moreira, Rio de Janeiro, Brazil

[21] Appl. No.: 871,148

[22] Filed: Jan. 20, 1978

Related U.S. Application Data

[62] Division of Ser. No. 693,198, Jun. 7, 1976, Pat. No. 4,083,743.

[51] Int. Cl.² .............................................. B32B 7/02
[52] U.S. Cl. .................................... 428/212; 156/278; 156/306; 428/219; 428/280; 428/282; 428/286; 428/288; 428/290; 428/507; 428/511; 428/514; 428/530; 428/531; 428/535; 428/537
[58] Field of Search ............... 428/284, 280, 282, 286, 428/288, 290, 507, 511, 514, 530, 531, 535, 537, 212, 219; 156/278, 306

[56] References Cited
U.S. PATENT DOCUMENTS

| 4,083,743 | 4/1978 | Degens | 156/278 |
| 4,083,744 | 4/1978 | Degens | 156/306 |

*Primary Examiner*—Marion E. McCamish
*Attorney, Agent, or Firm*—Richard P. Crowley

[57] ABSTRACT

A composition board which comprises a thin nonfrangible sheet material suitable for use as a surface covering, which material comprises: a fibrous sheet material impregnated with a cured thermosetting resin and characterized by one surface which is a nonporous, adhesive-free, fully cured surface, and another surface which is characterized by an adhesive-rich nonsanded surface, the adhesive being compatible with the cured resin, the adhesive-rich surface adapted to be bonded to a substrate, and the resin-rich surface used as a face surface for the substrate.

14 Claims, 4 Drawing Figures

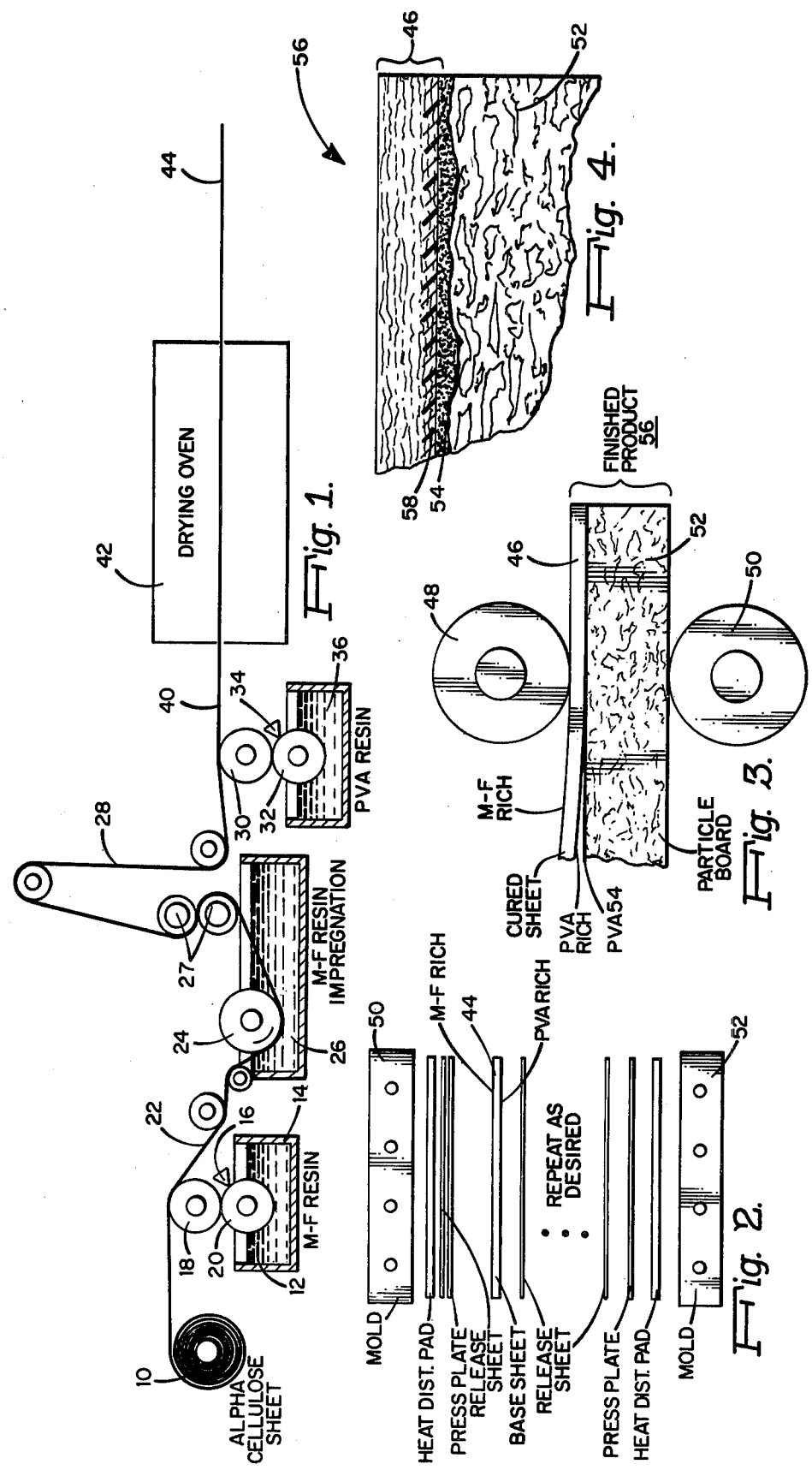

COMPOSITION BOARD WITH IMPROVED POLYMERIC SKIN

This is a division of application Ser. No. 693,198, filed June 7, 1976 (now U.S. Pat. No. 4,083,743, issued Apr. 11, 1978).

BACKGROUND OF THE INVENTION

Composition boards like particle boards or other substrates with a thin, hard, formic-like top surface covering are well known. Typically, the surface comprises a cured thermoset resin in a translucent, opaque or printed sheet which is secured to one surface of the board to provide a wear- and stain-resistant surface, such as, for example, in kitchen counter tops, wall coverings, furniture and the like.

A prior art standard method (the high-pressure method) of preparing such composition boards has been to prepare a thick resin-cured laminate overlay sheet typically with four or more underlay sheets of resin-impregnated kraft paper. The overlay sheet is prepared under high pressure and resin-curing temperatures, and the back surface of the laminate sanded or roughened. The laminate, for example, with a conventional thickness of about 0.35 inches, is then glued by means of low or contact-pressure adhesives to the composition board surface. This method requires multiple underlay sheets to provide a cured laminate overlay of sufficient strength to be handled and sanded.

Another technique for producing such composition boards (the low-pressure method) is also used, but likewise has several disadvantages.

In one method, a board core; that is, usually a thick layer of wood chips bonded together by a resin with a thickness ranging from about 0.25 cm to 5.0 cm or more, is used as a base, and a thin, transparent, opaqued or printed sheet, which is impregnated with a curable thermoset resin, such as a melamine-formaldehyde resin, is bonded to the top surface of the board by subjecting it to heat and pressure sufficient to effect simultaneously the curring or fusing of the melamine-formaldehyde reins in the sheet.

In such operation, care must be taken not to employ too much pressure, since pressure, for example, in excess of 10 or 20 kilos per square centimeter or above, often alters or weakens the mechanical and structural properties of the underlying board. In any event, the use of such pressure always reduces the thickness of the board in some degrees. Care must be taken also in the selection of the board, since a board usually has a relatively rough surface created by larger particles or chips of wood and, for example, of more than about 0.3 mm± variation in thickness, would be unacceptable, since the underlying surface defects of the board may be telegraphed through the thin sheet to cause undesirable ripples and surface defects on the top cured surface.

Attempts have been made to overcome this defect by employing wood chips of particularly graded particle size on the surface of the board, but this is expensive and involves another process step. In addition, efforts have been made to smooth; e.g., to presand or presurface, the board surface to make it more acceptable and to raise it into a highly-quality surface board, which is also expensive.

A method of overcoming the problems of telegraphing has been to select a very short heat cycle and to restrict the amount of pressure involved; for example, a heat cycle of only 30 to 90 seconds, and a pressure typically below 20 kilos per square centimeter, such as 5 kcm or lower. By this operation, telegraphing and deterioration of the particle board by heat is minimized and reduction in thickness of the board is minimized also. The top surface of the board prepared in this manner, however, does not present a fully cured resin surface on the thin sheet, but rather a less than fully cured thin top sheet which is more porous in nature than a fully cured sheet, which is subject to high heat and high pressure and longer curing times. The top surface, by being more porous and not fully cured, does not have the high-heat and temperature-resistant properties which would be desirable, and such top surfaces exhibit a reduced resistance to chemicals and stains and a low-resistant surface to abrasion, wear and scratches which is unsatisfactory for many uses.

A further technique employed to overcome the problems associated with telegraphing by the rough surface of a board has been to employ a relatively thick kraft or alpha paper which is impregnated with a thermoset curable resin as an underlay between the thin resin-impregnated top sheet and the rough surface of the board. By this process, lower-quality or rough-type particle boards can be employed and telegraphing prevented. One difficulty associated with the technique is that it involves extra expense and cost through the use of the kraft or alpha paper underlay, and further there is often a visible "show-through" of the phenolic resin impregnated in the kraft paper. In addition, although this technique prevents telegraphing, it still does not permit the use of very high pressures nor the preparation of a fully cured and high stain-, scratch-, abrasion- and wear-resistant top surface in the low-pressure process.

An economic disadvantage associated with the low-pressure process is that any surface defects discovered in the thin top surface result in the discarding of the entire board or at least a reduction in size or trimming of the entire board. Therefore, it is most desirable to prepare a composition board having a thin, fully cured, polymeric, thermoset skin without the disadvantages of the foregoing low- or high-pressure techniques, and which board with the thin skin will exhibit high-heat temperature, high stain, scratch and abrasion resistance.

SUMMARY OF THE INVENTION

My invention relates to an improved, flexible, fully cured, resin-impregnated sheet material suitable for use as a surface on a composition board or other substrate, to an improved laminate, such as a composition board, prepared with my cured sheet material secured thereto, and to the method of preparing the cured resin sheet material and the improved laminate.

I have discovered that a curable, thermosetting resin, such as a condensable amino resin, like a melamine-formaldehyde resin, impregnated in a transparent, opaque or printed fibrous sheet material, can, in a separate operation, be subject to high heat and pressure conditions to produce a fully cured, nonporous, flexible sheet material. Thereafter, the fully cured resin sheet material can be bonded at room or low temperatures and at low or contacting pressures to a substrate surface; e.g., a composition board surface. I have found that subjecting a thin, melamine-resin-impregnated alpha sheet material to high pressures and a curing temperature in a separate operation provides for a very thin, fully cured sheet material. However, the sheet material was incapable of being used, since it was quite frangible in nature, sometimes almost like glass, so that it could not be sanded and handled in the ordinary course of manufacture or be secured by bonding to the surface of a board. Attempts to incorporate plasticizers or fillers into the resin used in impregnating the sheet material were not satisfactory, since such addition of materials reduced the quality of the cure and the chemical and physical properties of the resulting thin sheet material.

However, I have now found that, if a layer of an adhesive material, such as polyvinyl acetate, compatible with thermosetting resins like melamine-formaldehyde resins, is applied, such as by coating or transferring, to one surface of a thin resin-impregnated alpha-type sheet material, and the sheet material is then subject to high pressures and curing temperatures, the resulting sheet material is a flexible sheet material and may easily be handled, and, thereafter, bonded without sanding in a separate bonding operation to the surface of a particle board. The sheet material produced is thus a very thin fibrous sheet material which contains a fully cured, thermosetting, resin-rich surface on the face surface and an adhesive, like polyvinyl-acetate of adhesive rich, surface on the back or bonding surface. Apparently, although not wishing to be bound by any particular theory, the compatible adhesive flows and is forced into the resin fibrous sheet during the high-pressure curing cycle and provides for a flexible carrier sheet, while providing an adhesive-rich surface for later aid in bonding of the sheet directly to the surface of a composition board without sanding of the back surface.

By my technique, the thin resin-impregnated sheet can be subject to any desirable high pressures and temperatures in order to insure what the impregnated resin in the sheet material is fully and adequaterly cured, and not only fused as in short heat-cycle operations. My sheet avoids the problems associated with compacting the board at high pressures which weaken or seriously damage the board if carried out while the sheet is on the board. Typical pressures which may be employed in my method would range from over 20 kilos per centimeter square ($k/cm^2$), such as from 30 to 100 $k/cm^2$. In addition, due to the thinness of the sheet material and since the entire board does not have to be heated or be subjected to high pressure, many more of my thin sheet materials may be placed in the opening of the high-pressure press and heated for a longer period of time, such as from 3 (for catalyzed resins) up to 60 minutes (for uncatalyzed resin) if desired; e.g., 10 to 20 minutes, for example, at 104 to 121° C., depending on the number of sheets in one opening of the press, the heating-up and cooling-down time of the molds and press plates, in order to insure that the resin is fully cured. The cured sheets provide a nonporous surface which has higher heat-temperature, stain, chemical, abrasion, scratch and wear resistance and better impact strength than produced by shorter heat cycles at lower pressures, as in the low-pressure process.

In addition, another important advantage of my invention is that the resulting flexible sheet can be examined and defects removed prior to bonding to the board without discarding the underlying board, thereby reducing cost and waste. Furthermore, as will be evident, the production efficiency and rate can be considerably increased in a high-pressure press, since the thin impregnated resin sheet would only be subject to high temperatures and curing temperatures without the presence of the entire board, thereby permitting a higher production rate.

My technique and invention also permit the easy handling of the cured resin sheet prior to bonding to the board surface. The use of my material does not necessitate the use of a kraft or other underlay sheet, as in the high-pressure process, or with rough surface; although, if desired, such underlays may be employed. My fully cured skin sheet material permits the use of lower-quality particle boards or other materials with rougher surfaces than previously used, since the adhesive glue material employed can fill in the variations in the rough surface, and telegraphing of the surface variations is minimized.

Thus, particle boards having surface variations of up to ±0.3 mm can be used in the preparation of high-pressure laminates with composition boards, such as particle boards. Fine-particle or carefully graded wood chips as a layer on the surface of the particle board to obtain a smooth surface need not be used, since my resin-cured skin layer may be simply glued on at very low or with only contacting pressures and temperatures, and, the adhesive glue line compensates for the imperfections, if any, in the surface of the board. Also, my thin sheet material could not be sanded without breaking; however, it does not require sanding or roughening of the adhesive-rich back surface, as the thick laminate overlay sheets of the high-pressure process.

An important addition, of course, is that, by the use of only contact or low pressures in bonding on my cured resin-impregnated sheet material to the board, the thickness of the board is not reduced, as in past low-pressure methods, by higher pressures, but the thin sheet is, in fact, an added thickness layer to the board. The disadvantages of the prior method, when a particle board is subject to high pressures and temperatures which alter the mechanical and structural features of the board, are avoided, since the bonding pressures employed do not cause any change in the underlying board.

The sheet material employed is typically a very thin; for example, about 0.1 to 0.3 mm, fibrous; e.g., cellulosic, sheet material having a basis weight of from 15 to 180 grams per square meter (gsm); e.g., 80 to 120 gsm; although higher weights can be used if desirable, but it is more expensive. The sheet is impregnated with a curable, cross-linkable or thermosetting resin material, and often is an alpha cellulosic paper sheet. A wide variety of curable resins may be used to impregnate the sheet, such as a melamine resin, such as a melamine-formaldehyde or urea-formaldehyde resin, as well as other water- or alcohol-soluble, condensable amino resins and phenol-formaldehyde resins and cocondensable mixtures thereof, alone or with other materials and additives used in such resin formulations. Other heat-curable, condensable, thermosetting resins may also be used. The resin content of the dried sheet ranges from about 20 to 70% by weight, depending on the basis weight of the sheet used. The impregnated sheet may be relatively transparent or translucent, or it may be opaque, colored or have a printed design therein which is decorative on the surface. The sheet material is very thin and often only one sheet is employed; although several sheets of varying designs or combinations or a transparent top sheet and an underlying printed sheet may be used, and the sheets may be used alone or in combination with underlying sheets of other fibers, such as a curable resin-impregnated kraft or alpha or other paper or underlay material.

The adhesive or glue employed may comprise a wide variety of natural or synthetic adhesive materials, such as a vinyl ester of a short-chain acid $C_2$–$C_6$ like a vinyl-acetate resin, for example, in an alcohol or water emulsion or in a water or organic solvent solution. Any compatible adhesive or polymeric-type resin, having adhesive properties which are compatible with the resin employed in the thin sheet material, may be employed. Polyvinyl-acetate resin (PVA) is the preferred material.

The adhesive layer is either coated onto or transferred to the one surface of the thin sheet material by a transfer mechanism in a desired thickness which permits the lower surface to become adhesive-rich, but insufficient in amount to permit the adhesive to flow and pass completely through the thin sheet material and appear on the top surface. The adhesive typically impregnates less than about a majority of the depth of the thin sheet, such as up to about 25% of the depth of the thin sheet.

My cured sheet material may be secured by the selected adhesive, or any combination of adhesives, to any substrate surface, particularly a cellulosic-based hard surface or supporting surface, such as hard board, plywood, natural wood, wallboard, composition board comprising wood fibers and hardened resin, such as a particle board, and similar sheet materials which are employed in use for furniture, counter tops, wall surfaces and the like. The cured sheet material may be adhesively bonded to one or both surfaces of the substrate.

For the purpose of illustration only, my invention will be described in its preferred embodiment, wherein a cured sheet material is adhesively bonded by a particular adhesive to the top surface of a particle board. However, it is recognized and is within the spirit and scope of my invention that changes and modifications may be made in the described embodiment, by those persons skilled in the art, which are within the scope and understanding of my invention.

BRIEF DESCRIPTION OF THE DRAWINGS

FIG. 1 is a schematic illustration of my process of manufacturing my curable sheet materials.

FIG. 2 is a schematic illustration of an enlarged exploded view of the process for curing my sheet material of FIG. 1 in a press.

FIG. 3 is a schematic cross-sectional illustration of the process of securing my cured sheet material to the surface of a particle board.

FIG. 4 is a representative fragmentary enlarged cross-sectional view of the finished particle board laminate product produced by the process of FIG. 3.

DESCRIPTION OF THE EMBODIMENTS

FIG. 1 is an illustration of the process of preparing a curable sheet material of my invention which is characterized by a one surface being a cured resin-rich surface, and the other surface being an adhesive-coated surface, wherein a decorative sheet material to be impregnated 10, such as an alpha cellulose sheet, basis weight 35 to 200 g/cm$^2$, is prewet on one surface with a resin solution 12 in a container 14 which comprises an aqueous solution of a heat-curable melamine-formaldehyde (MF) resin solution. The resin solution 12 is applied by a resin applicator which comprises a pair of rollers 18 and 20 and a doctor knife 16 or by other coating applicator means. The resin prewet sheet 22 is then impregnated with the same or a different curable thermosetting resin, such as a melamine-formaldehyde resin solution 26, by a roller 24, which immerses the sheet in the container of the resin solution. The "pick-up" of the resin on the sheet is controlled by squeeze rollers 27 shown or by a wire bar and/or by an air knife. The resin-impregnated sheet 28 is then coated on one surface with an MF-compatible adhesive material, such as a polyvinyl-acetate (PVA) resin emulsion 36, through rollers 30 and 32 with a doctor knife 34, wherein a coating of the adhesive is applied to one side of the sheet material 28.

The PVA-coated curable resin-impregnated sheet 40 is then dried in a hot-air oven 42 or by other means, such as radiant heaters, or a combination thereof, to drive off the water and/or any volatile organic vapors where aqueous or organic solvent solutions or emulsions are employed and for partial condensation of the resin, with the oven temperature typically from about 110 to 200° C.; e.g., 140 to 160° C. A curable, flexible, nonfrangible sheet material 44 is recovered, which material is characterized by a curable MF resin-rich surface, with the curable resin impregnated throughout the sheet, and the opposite surface coated with a dried PVA coating of the desired thickness; e.g., 1 to 20 mils.

FIG. 2 shows the curing of the sheet material 44 in a high-temperature/high-pressure press to provide a fully cured, thin, flexible, nonfrangible sheet material. A pair of steam or electrical heat-mold plattens 50 and 52 are employed in an arrangement with pads which serve as insulating- and heat-distributing pads for better or even heat distribution, in combination with release sheets as required between the sheet material. The press plates, typically of stainless steel with a polished finish surface, enclose a plurality of curable sheet materials 44 placed in the opening of the press.

In operation, the sheet materials 44 in the press are subject to pressures of over 20 k/cm$^2$; e.g., such as 25 to 40 k/cm$^2$; e.g., 35 k/cm$^2$, at temperatures of about 90° to 180° C, such as 105° C. to 150° C., for a time, such as 10 to 20 minutes, to provide a fully cured, nonfrangible, flexible sheet material 46. The operation forces the coated adhesive material 36 into the one surface of the resin-impregnated sheet 44, so that the resulting material 46 is characterized by a dried PVA-rich surface and a cured MF-resin-rich surface. The adhesive is forced into the one surface to a desired depth, but insufficient to force the PVA to the cured resin-rich surface, such as about from 10 to 40% of the sheet depth. The cured flexible sheet material is now ready for use as a surface in a laminate product. The resulting sheet material 46 may be handled in the normal course of manufacture without excessive cracking or crazing due to its nonfrangible nature, an importantly without the necessity of sanding for bonding. The sheet material 46 may be inspected for defects at this stage, and then stored typically in sheet form for use later in preparing laminates.

The overlay press cycle to be employed depends on a number of factors, including, for example, the temperature of the heating medium, the temperature and velocity of the cooling water, and also the number of sheets placed in an opening of the press. Unlike the prior art high-pressure process, a large number of my thin sheets can be placed in the press opening; e.g., 30 to 60 sheets per opening, and thus in a multiple-opening press, overall production of the sheets is enhanced, even though the press cycle is longer than in the prior art low-pressure process.

The mechanical cycle is the time period between the closing and opening of the press, while the heat cycle is the time period during which the sheets are subject to the resin-curing temperature while in the press. The mechanical cycle may vary, for example, from 20 to 40 minutes, depending upon the press and conditions used, while the heat cycle may vary, depending on the heat transfer requirements which are related to the number of sheets in the press and the use or nonuse of metal press plates and other factors. The heat cycle is shorter where a catalyst resin is used and longer where a noncatalyst resin is used; e.g., as low as 3 minutes or lower to as long as 40 minutes or more.

In one embodiment, a high-pressure press was used with 50 sheets per press opening with no press plates used, and with a silicone-type or other release paper used between the sheets. The overall mechanical cycle was between 28 to 30 minutes. The press was closed at 70° C., the pressure reached was 35 k/cm², the heat cycle curing time was 12 to 14 minutes for a noncatalyst MF resin, and the heat cycle temperature range was about 105 to 121° C. On reaching a temperature of about 116° C., the cooling of the press is started to bring the press to its starting temperature. The resulting sheet material was a flexible and nonfrangible sheet of the type described.

FIG. 3 illustrates the process of securing the sheet material to a selected substrate, wherein the material 46 is passed through a pair of opposing rollers 48 and 50, with low contact pressure applied to force the material 46 into contact with the rough surface of a composite wood-chip, resin-bonded particle board 52. The particle board preferentially is coated with a thin coating of 0.1 to 20 mils with an adhesive compatible with the adhesive in the sheet 46, and preferentially the same or a similar adhesive; to wit, a PVA resin slightly wet or tacky adhesive surface. Also the use of the additional adhesive coating is optional, and other adhesive materials, such as resorcinol resins or other natural or synthetic, contact adhesives used, like urea-formaldehyde resin adhesive alone or in combination with vinylacetate resins like PVA. The bonding may be carried out without sanding the back surface of the sheet and at room temperatures or low temperatures, as in the high-pressure process. Surface defects of the particle board 52 are not telegraphed, or telegraphing is minimized, through the hard cured sheet material. Due to the low pressure and temperature cycle used to bond adhesively the sheet material, the soft particle board 52 is not reduced in thickness nor weakened by the adhesive-bonding operation. The finished product 56 may be employed as a kitchen or bathroom counter top or for furniture surfaces or other uses as desired.

FIG. 4 is a fragmentary cross-sectional illustration of the unitary laminate product 56, wherein the particle board, composed of wood chips bonded with resin 52, has the fully cured, wear- and stain-resistant, nonporous, resin-rich sheet material 46 adhesively bonded by adhesive line 54 to the rough surface of the particle board 52, with the vinyl-resin adhesive 58 impregnated into the cured MF sheets as illustrated.

My fully cured thin sheet material with the adhesive-rich resin-rich surfaces and the finished laminate material prepared by the use of this sheet material provide superior and unexpected advantages over the prior art materials and processes.

What I claim is:

1. A thin nonfrangible sheet material suitable for use as a surface covering, which material comprises a fibrous sheet material having a basis weight of from about 15 to 180 gsm and impregnated substantially through the depth with from about 20 to 70% by weight of a cured thermosetting resin and characterized by one surface which is a nonporous, adhesive-free, fully cured, resin-rich face surface, and another surface which is characterized by an adhesive-rich back surface, the adhesive being compatible with the cured resin, the depth of penetration of the adhesive sufficient to permit the sheet material to be flexible and capable of being handled without fracture thereof, the adhesive-rich back surface adapted to be bonded to a substrate, and the resin-rich surface adapted to be used as a face surface covering on a substrate.

2. The sheet material of claim 1 wherein the adhesive is a vinyl-acetate resin.

3. The sheet material of claim 1 wherein the resin is a melamine-formaldehyde resin.

4. The sheet material of claim 1 wherein the adhesive impregnates up to about 50% of the depth of the sheet material.

5. The sheet material of claim 1 wherein the paper is an alpha cellulosic paper.

6. A laminate material wherein the adhesive-rich surface of the sheet material of claim 1 is bonded to at least one surface of a sheet substrate material.

7. The laminate material of claim 6 wherein the substrate material is a composition board.

8. The laminate material of claim 6 which includes an adhesive coating layer on the surface of the substrate between the adhesive-rich surface and the substrate surface.

9. The sheet material of claim 1 wherein the fibrous sheet material includes a top transparent sheet material and an underlying printed sheet material.

10. The sheet material of claim 1 wherein the sheet material is a cellulosic sheet material having a thickness of from about 0.1 to 0.3 mm.

11. An improved composition board having a thin, cured, resin surface, which particle board comprises:
   (a) a composition board; and
   (b) a thin fibrous nonfrangible sheet material bonded to at least one surface of the composition board, the sheet material having a basis weight of from about 15 to 180 gsm and characterized by a top face surface which is heat- and temperature-resistant and has a high abrasion, wear and scratch resistance, substantially the entire thickness of the sheet material having a fully cured melamine-formaldehyde resin therethrough, the cured resin in an amount of from about 20 to 70% by weight of the sheet material, with the back bonding surface of the sheet material being a vinyl-acetate resin adhesive-rich surface, the vinyl-acetate resin adhesive impregnating the sheet material up to a depth of about 50%, the adhesive-rich back surface being unsanded and bonded to the one surface of the board by an adhesive layer.

12. The composition board of claim 11 wherein the adhesive layer comprises polyvinyl-acetate resin, urea-formaldehyde resin or a combination thereof.

13. The composition board of claim 11 wherein the sheet material comprises an alpha cellulosic sheet material and the sheet material has a thickness of about 0.1 to 0.3 mm.

14. A thin nonfrangible sheet material suitable for use as a surface covering on a composition board which sheet material comprises a thin fibrous alpha cellulosic sheet material having a basis weight of from about 15 to 180 gsm and impregnated substantially through its depth with from about 20 to 70% by weight of a cured melamine-formaldehyde resin and characterized by one surface which is a nonporous, adhesive-free, cured, resin-rich face surface, and another surface which is characterized by an adhesive-rich, nonsanded back surface, the adhesive composed of a polyvinyl-acetate resin, the adhesive impregnating the sheet material from the back surface up to about 50% of the depth of the sheet material to provide a nonfrangible sheet material with the resin-rich face surface adapted to be used as a protective cover and the adhesive-rich back surface adapted to be bonded to the surface of a composition board.

* * * * *